US011584430B2

(12) United States Patent
Hansen et al.

(10) Patent No.: US 11,584,430 B2
(45) Date of Patent: Feb. 21, 2023

(54) HYDRAULIC STEERING ARRANGEMENT

(71) Applicant: Danfoss Power Solutions ApS, Nordborg (DK)

(72) Inventors: Niels Bjarne Hansen, Aabenraa (DK); Søren Pedersen, Sønderborg (DK); Tom Rudolph, Sydals (DK); Jens Vester, Sønderborg (DK); Morten Hoeck Petersen, Rødekro (DK); Thomas Traeger Hansen, Nordborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 605 days.

(21) Appl. No.: 16/595,832

(22) Filed: Oct. 8, 2019

(65) Prior Publication Data

US 2020/0114955 A1 Apr. 16, 2020

(30) Foreign Application Priority Data

Oct. 10, 2018 (DE) ........................ 102018125049.5

(51) Int. Cl.
*B62D 5/09* (2006.01)
*B62D 5/065* (2006.01)
(Continued)

(52) U.S. Cl.
CPC ............... *B62D 5/09* (2013.01); *B60W 10/20* (2013.01); *B62D 5/065* (2013.01); *B62D 6/008* (2013.01); *B60W 2540/18* (2013.01)

(58) Field of Classification Search
CPC .......... B62D 5/09; B62D 6/008; B62D 5/065; B60W 10/20; B60W 2540/18
See application file for complete search history.

(56) References Cited

U.S. PATENT DOCUMENTS 4,792,008 A * 12/1988 Hosotani ................ B62D 5/093 180/422
5,020,618 A * 6/1991 Nagao .................... B62D 5/097 91/467

(Continued)

FOREIGN PATENT DOCUMENTS

DE 102004027971 A1 * 1/2005 ............... B62D 5/09
DE 102005035874 A1 * 2/2007 ............ B62D 5/065

(Continued)

OTHER PUBLICATIONS

European Search Report for Serial No. EP 19197663.8 dated Mar. 23, 2020.

*Primary Examiner* — Jacob D Knutson
(74) *Attorney, Agent, or Firm* — McCormick, Paulding & Huber PLLC

(57) ABSTRACT

A hydraulic steering arrangement (1) comprising a supply port arrangement having a pressure port and a tank port, a working port arrangement having two working ports (L, R), a mechanical steering unit (3) connected to a steering wheel (2) and being arranged between the supply port arrangement and the working port arrangement (L, R), supply valve means (12) having a connection to the pressure port and to the working port arrangement (L, R) and being controlled by a controller (10), and a steering wheel sensor (9) connected to the controller (10) is described. Such a steering arrangement could allow a comfortable feeling for the driver. To this end the steering wheel sensor (9) is mounted in a position of minimum play to steering wheel (2) and steering wheel sensor (9) and detects a beginning of a movement of the steering wheel (2), wherein the controller (10) actuates the supply valve means (12) upon beginning of the movement, and the supply valve means (12) supply hydraulic fluid to the working port arrangement (L, R).

15 Claims, 2 Drawing Sheets

(51) Int. Cl.
*B62D 6/00* (2006.01)
*B60W 10/20* (2006.01)

(56) References Cited

U.S. PATENT DOCUMENTS

| | | | | | |
|---|---|---|---|---|---|
| 5,275,251 | A * | 1/1994 | Thomsen | B62D 5/32 180/422 |
| 5,303,636 | A * | 4/1994 | Stephenson | B62D 5/097 91/361 |
| 7,997,379 | B2 | 8/2011 | Kryhlmand et al. | |
| 2002/0166319 | A1* | 11/2002 | Grebe | B62D 5/065 60/385 |
| 2003/0196432 | A1* | 10/2003 | Pedersen | B62D 5/097 60/384 |
| 2008/0202841 | A1* | 8/2008 | Biener | B62D 5/093 180/403 |
| 2014/0138165 | A1 | 5/2014 | Bebernes et al. | |
| 2014/0298798 | A1 | 10/2014 | Belshan et al. | |
| 2018/0297632 | A1* | 10/2018 | Emmert | B62D 1/22 |

FOREIGN PATENT DOCUMENTS

| | | | | |
|---|---|---|---|---|
| DE | 102006010695 | A1 | 9/2007 | |
| DE | 112016000782 | T5 | 10/2017 | |
| EP | 1112910 | A2 * | 7/2001 | B62D 5/06 |
| JP | 2001316096 | A * | 11/2001 | B62D 5/065 |
| WO | WO-9622214 | A1 * | 7/1996 | B62D 5/06 |

* cited by examiner

HYDRAULIC STEERING ARRANGEMENT

CROSS-REFERENCE TO RELATED APPLICATIONS

This application claims foreign priority benefits under U.S.C. § 119 to German Patent Application No. 102018125049.5, filed on Oct. 10, 2018, the content of which is hereby incorporated by reference in its entirety.

TECHNICAL FIELD

The present invention relates to a hydraulic steering arrangement comprising a supply port arrangement having a pressure port and a tank port, a working port arrangement having two working ports, a mechanical steering unit connected to a steering wheel and being arranged between the supply port arrangement and the working port arrangement, supply valve means having a connection to the pressure port and to the working port arrangement and being controlled by a controller, and a steering wheel sensor connected to the controller.

BACKGROUND

Such a hydraulic steering arrangement is known, for example, from DE 10 2006 010 695 A1.

The invention relates to a full hydraulic steering arrangement in which there is no mechanical connection between the steering wheel and the wheels to be steered. The driver driving a vehicle with such a steering system experiences a feeling different from a steering system in which the steering wheel is directly connected to the steered wheels. Possible reasons for this behaviour of the steering arrangement are universal joints between the steering wheel and the steering unit and a deadband of the steering unit. This results in a delay between the actuation of the steering wheel and the reaction of the steered wheels.

SUMMARY

The object underlying the invention is to give the driver a better steering feeling.

This object is solved with a hydraulic steering arrangement as described at the outset, in that the steering wheel sensor is mounted in a position of minimum play between steering wheel and steering wheel sensor and detects at least a beginning of a movement of the steering wheel, wherein the controller actuates the supply valve means upon beginning of the movement, and the supply valve means supply hydraulic fluid to the working port arrangement.

The position of the steering wheel sensor allows the immediate detection of an actuation of the steering wheel, i.e. the sensor detects a movement of the steering wheel without delay which is caused by a play greater than the minimum play. The best position of the steering wheel sensor would be near a shaft of the steering wheel which is directly connected to the steering wheel. In this way the delay caused by the mechanical play can be eliminated. The supply valve can immediately supply hydraulic fluid to the working port arrangement so that upon actuation of the steering wheel a steering actuator connected to the working port arrangement can start to change the direction of the steered wheels. The steering wheel sensor can continue to measure the steering wheel angle.

In an embodiment of the invention the supply valve means comprises a remotely controlled valve. The remotely controlled valve is controlled by the controller, so that no action of the driver is necessary.

In an embodiment of the invention the supply valve means comprises at least a solenoid valve. A solenoid valve is a simple embodiment of a remotely controlled valve. It can be actuated by supplying electrical energy to the solenoid valve.

In an embodiment of the invention the supply valve means supply a predetermined volume of hydraulic fluid to one of the working ports indicated by the direction of rotation of the steering wheel upon activation of the steering wheel. The volume is sufficient to compensate the play between the steering wheel and the steering unit and the deadband of the steering unit. Accordingly, a linear relationship between the steering actuator and the steering wheel position or angle can be achieved starting as close as possible from a zero point.

In an embodiment of the invention the supply valve means stop supplying hydraulic fluid to the working port arrangement once the steering wheel reaches a deadband angle of the mechanical steering unit. As soon as the deadband angle of the mechanical steering unit is reached, the further steering of the vehicle can be achieved under action of the mechanical steering unit. Accordingly, no further supply of hydraulic fluid through the supply valve means is necessary. In another embodiment the supply valve continues to supply hydraulic fluid after reaching the deadband angle.

In an embodiment of the invention the predetermined volume is adjustable as function of at least one predetermined parameter. Thus, the user has the possibility to adjust the predetermined volume by changing a parameter. The parameter can be, for example, the driving speed of the vehicle, the load of the vehicle or other mechanical conditions.

In an embodiment of the invention the controller is connected to at least one additional sensor sensing a characteristic of the steering arrangement. The characteristic can be, for example, a temperature, a stand-by pressure, a pump pressure or the like. In this way it is possible to increase the quality of the prediction of the optimal open loop flow wanted upon a steering wheel activation. A temperature sensor can be used to measure the oil temperature and predict the viscosity which may then be included in the open loop control algorithm. The open loop control algorithm could also utilize inputs from other smart sensors to optimize the electronic deadband compensation.

In an embodiment of the invention the wheel angle sensor is connected to the controller. The controller can use a signal from the wheel angle controller for monitoring of the wheel angle movement. Thereby, the controller can stop the flow of hydraulic fluid through the supply valve if the wheel angle response is larger than expected. Furthermore, the wheel angle sensor can be used for calibration routines, during which the open loop controller can be adjusted to the optimal performance. Finally, the wheel angle feedback can be used for an adaptive control, so the operator will always feel the same steering response in every driving condition.

In an embodiment of the invention the controller is part of a closed loop system. Using the signals from the steering wheel sensor and the wheel angle sensor the controller can perform closed loop control between these two signals. This means that the flow of hydraulic fluid supplied by the supply valve means will be added whenever the wheel angle does not follow the steering wheel and when the error between the wheel angle and steering wheel can be eliminated solely by the steering unit flow, then no flow to the supply valve means will be added.

In an embodiment of the invention a steering unit input angle sensor is connected to the controller. In other words, an additional rotation sensor is added to the steering system at the input side of the steering unit. The steering wheel sensor is still mounted in a position where the play between the steering wheel sensor and the steering wheel is as small as possible, while the second sensor is mounted on or near the steering unit itself. Thereby, input of each of these sensors can be used in different control strategies. The input from the steering wheel sensor can be used for a control strategy to eliminate or modify the mechanical play. The input from the steering unit input angle sensor can be used to compensate for the hydraulic deadband in the steering unit.

BRIEF DESCRIPTION OF DRAWINGS

Preferred embodiments of the invention will now be described in more detail with reference to the drawing, wherein.

DETAILED DESCRIPTION

Figure 1:
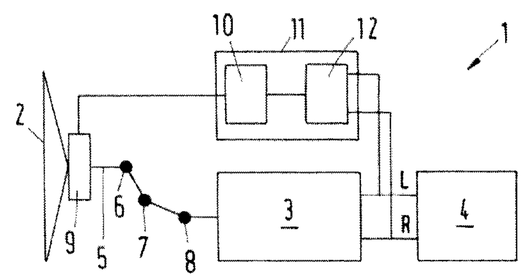
FIG. 1 is a schematic illustration of a steering arrangement.

FIG. 1 shows schematically a hydraulic steering arrangement 1 comprising a steering wheel 2, a mechanical steering unit 3 and a steering actuator 4. The steering actuator 4 is connected to working ports L, R of the steering unit 3. The steering unit 3 is furthermore connected to a supply port arrangement having a pressure port and a tank port, which are not shown in the drawing in order to keep the drawing simple.

The steering wheel is connected to a steering column 5 which by means of universal joins 6, 7, 8 is connected to the steering unit. Each of the universal joins 6-8 has a play which is unavoidable.

A steering wheel sensor 9 is located as close as possible to the steering wheel 2, preferably directly adjacent to the steering column 5 or to another part which is connected free of play to the steering wheel 2. Accordingly, the steering wheel sensor 9 is able to detect a beginning of a movement of the steering wheel without delay.

The steering wheel sensor 9 is connected to a controller 10 which is part of an electro-hydraulic steering unit 11. The electro-hydraulic steering unit 11 furthermore comprises supply valve means 12 that are connected to and controlled by the controller 10. The supply valve means 12 are connected to the working port arrangement L, R and are furthermore connected to the pressure port of the supply port arrangement. Thus, when the supply valve means 12 are opened, they can supply hydraulic fluid from the pressure port to one of the working ports L, R.

When the steering wheel 2 is actuated, there is, as a rule, a backlash in the mechanical connection from the steering wheel 2 to the hydraulic steering unit 3. Furthermore, there is usually a hydraulic deadband in the hydraulic steering unit 3. This means that when the steering wheel 2 is rotated, nothing happens in a first instance. Accordingly, this results in a delayed response of the steering actuator and the steered wheels actuated by the steering actuator.

The steering wheel sensor 9 does not have such a delay in detecting the movement of the steering wheel. Accordingly, it is possible to transmit an information about the actuation of the steering wheel 2 immediately to the controller 10 and from there to the supply valve means 12 which then are able to steer out hydraulic flow to the steering actuator 4 before flow is steered out by the steering unit 3. In this way the driver or operator will not feel the deadband of the steering unit and not feel the backlash caused by the mechanical play.

The supply valve means 12 can comprise a pilot pressure control spool, a constellation of solenoid valves or another device which can be applied remotely to control the flow supplied to the working port arrangement upon activation of the steering wheel 2 and which can be operated remotely by the controller 10.

Figure 2:
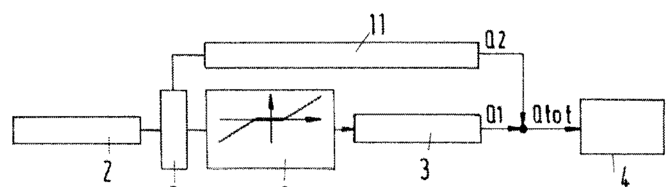
FIG. 2 is a block diagram of the steering arrangement according to FIG. 1.

FIG. 2 shows a block diagram of the steering arrangement 1 shown in FIG. 1. Same elements are denoted with the same reference numerals.

A box 13 schematically shows the delay which is caused by deadband of the hydraulic steering unit 3 and the play of the universal joints 6-8 between the steering wheel 2 and the steering unit 3.

The steering unit 3 outputs a flow $Q_1$ to which adds a flow $Q_2$ delivered by the electro-hydraulic unit 11.

Figure 3:
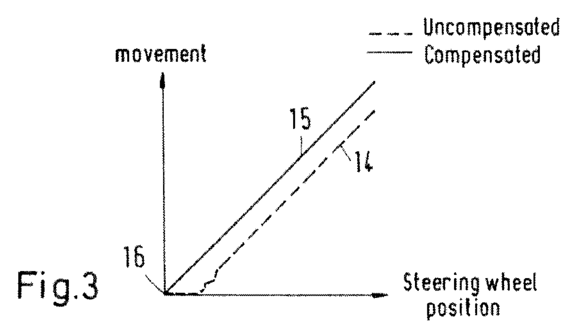
FIG. 3 shows a relationship between steering wheel position and steering cylinder position.

The function of this arrangement is schematically shown in FIG. 3. A graph 14 shows the relation between the steering actuator movement and the steering wheel position using the steering unit 3 only. It can clearly be seen that there is a certain delay between the steering wheel position and the steering actuator movement, i.e. the steering wheel has to be rotated by a certain angle before the steering actuator reacts.

However, when the electro-hydraulic unit 11 supplies additional hydraulic fluid, there is another relation shown by graph 15 which starts from a zero point 16.

Figure 4:
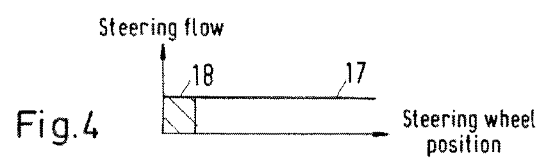
FIG. 4 is a schematic illustration of the flow behaviour for steering wheel activation according to FIG. 3.

FIG. 4 shows the flow behaviour for the steering wheel activation shown in FIG. 3. A graph 17 shows the steering flow outputted by the steering unit 3 and a graph 18 shows the flow outputted by the electro-hydraulic steering unit 11. It can be seen that the output of the electro-hydraulic unit 11 is stopped once the steering wheel has reached a position (i.e. a steering wheel angle), which corresponds to the deadband angle of the mechanical steering unit 3.

Figure 5:
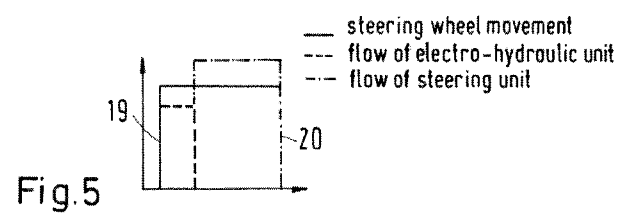
FIG. 5 is a schematic visualization of open loop deadband compensation.

As shown in FIG. 5, it is not necessary that the flow outputted by the electro-hydraulic unit 11 is the same as that of the steering unit. FIG. 5 shows a graph 19 showing the flow outputted by the electro-hydraulic unit 11 and a graph 20 showing the flow outputted by the steering unit 3. It can be seen that the flow 20 outputted by the steering unit 3 is much larger than the flow outputted by the electro-hydraulic unit 11. This flow can, however, be adjusted by parameter setting.

In addition to the system shown in FIG. 2, additional sensors can be added which can be used to improve estimation of the flow contributed by the electro-hydraulic unit 11. In this manner the fluid volume supplied by the electro-hydraulic unit 11 upon activation of the steering wheel 2 may be adjusted according to these sensor inputs. An additional sensor could be a pressure sensor. For instance, this pressure sensor could be used to measure the stand-by pressure, the pump pressure subtracted load sensing pressure, to increase the quality of the prediction of the optimal open loop flow wanted upon activation of the steering wheel 2.

Another additional sensor could be a temperature sensor which could be used to measure the oil temperature and predict the viscosity which may then be included in the open loop control algorithm.

The open loop control algorithm could also utilize input from other smart sensors to optimize the electronic deadband compensation.

Figure 6:
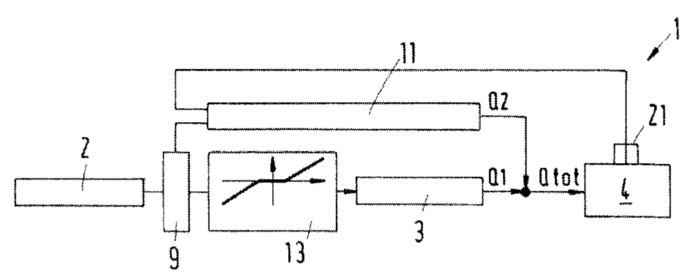
FIG. 6 is a second embodiment of the invention.

FIG. 6 shows a further embodiment of the steering arrangement 1 in which the same elements are denoted with the same reference numerals. However, a wheel angle sensor 21 is added which allows the controller 10 to use the signal of the wheel sensor 21 for monitoring the wheel angle movement. Thereby, the controller 10 can stop the flow contribution of the electro-hydraulic unit 11 if the wheel angle response is larger than expected.

Furthermore, the wheel angle sensor 21 can be used for calibration routines, during which the open loop controller can be adjusted to the optimal performance.

In addition or as an alternative, feedback of the wheel angle sensor 21 can be used for an adaptive control, so the operator will always feel the same steering response in every driving condition.

Using the signals from the steering wheel sensor 9 and the wheel angle sensor 21 can also be used to perform closed loop control between these two signals. This means that the flow $Q_2$ from the electro-hydraulic unit 3 will be added whenever the wheel angle does not follow the steering wheel 2, and when the error between the wheel angle and steering wheel 2 can be eliminated solely by the flow out of the steering unit 3, then no electro-hydraulic flow will be added.

Figure 7:
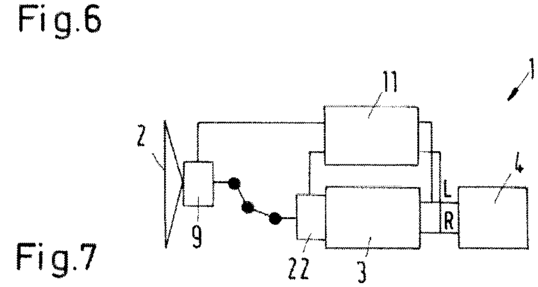
FIG. 7 is a steering arrangement equipped with two rotational sensors and FIG. 8 is a block diagram of the steering arrangement of FIG. 7.
Figure 8:
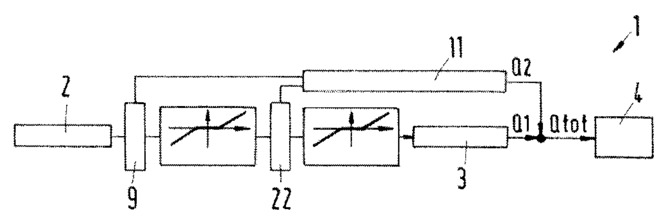

FIGS. 7 and 8 show another embodiment of the invention in which the same elements are noted with the same reference numerals.

A further sensor 22 has been added to detect an angle at the input of the steering unit 3. Accordingly, the sensor 22 is named "steering unit input angle sensor".

The steering wheel sensor 9 is still mounted in a position where the mechanical play between the steering wheel sensor 9 and the steering wheel 2 is as small as possible. The steering unit input angle sensor 22 is mounted on the steering unit 3 itself. Thereby an input of each of the sensors 9, 22 can be used in different control strategies. The input from the steering wheel sensor 9 can be used for a control strategy to eliminate or modify the mechanical play. The input from the steering unit input angle sensor 22 can be used in a control strategy of the hydraulic deadband in the steering unit 3.

The control strategy for this embodiment may be any of the above-mentioned methods.

The embodiment shown in FIGS. 7 and 8 can also be equipped with a wheel angle sensor 21.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering arrangement comprising a supply port arrangement having a pressure port and a tank port, a working port arrangement having two working ports (L, R), a mechanical steering unit connected to a steering wheel and being arranged between the supply port arrangement and the working port arrangement (L, R), supply valve means having a connection to the pressure port and to the working port arrangement (L, R) and being controlled by a controller, and a steering wheel sensor connected to the controller, wherein the steering wheel sensor is mounted in a position of minimum play between steering wheel and steering wheel sensor and detects at least a beginning of a movement of the steering wheel, wherein the controller actuates the supply valve means upon beginning of the movement, and the supply valve means supply hydraulic fluid to the working port arrangement (L, R), wherein the supply valve means supply a predetermined volume of hydraulic fluid to one of the working ports (L, R) indicated by the direction of rotation of the steering wheel upon activation of the steering wheel, and wherein the supply valve means stop supplying hydraulic fluid to the working port arrangement (L, R) once the steering wheel reaches a deadband angle of the mechanical steering unit.

2. The hydraulic steering arrangement according to claim 1, wherein the supply valve means comprises a remotely controlled valve.

3. The hydraulic steering arrangement according to claim 2, wherein the supply valve means comprises at least a solenoid valve.

4. The hydraulic steering arrangement according to claim 3, wherein the supply valve means supply a predetermined volume of hydraulic fluid to one of the working ports (L, R) indicated by the direction of rotation of the steering wheel upon activation of the steering wheel.

5. The hydraulic steering arrangement according to claim 3, wherein the controller is connected to at least one additional sensor sensing a characteristic of the steering arrangement.

6. The hydraulic steering arrangement according to claim 3, wherein a wheel angle sensor is connected to the controller.

7. The hydraulic steering arrangement according to claim 2, wherein the supply valve means supply a predetermined volume of hydraulic fluid to one of the working ports (L, R) indicated by the direction of rotation of the steering wheel upon activation of the steering wheel.

8. The hydraulic steering arrangement according to claim 2, wherein the controller is connected to at least one additional sensor sensing a characteristic of the steering arrangement.

9. The hydraulic steering arrangement according to claim 2, wherein a wheel angle sensor is connected to the controller and wherein the mechanical steering unit and the supply valve means are arranged in parallel, such that each can activate a steering actuator.

10. The hydraulic steering arrangement according to claim 1, wherein the predetermined volume is adjustable as function of at least one predetermined parameter.

11. The hydraulic steering arrangement according to claim 10, wherein the controller is connected to at least one additional sensor sensing a characteristic of the steering arrangement.

12. The hydraulic steering arrangement according to claim 1, wherein the controller is connected to at least one additional sensor sensing a characteristic of the steering arrangement.

13. The hydraulic steering arrangement according to claim 1, wherein a wheel angle sensor is connected to the controller.

14. The hydraulic steering arrangement according to claim 13, wherein the controller is part of a closed loop system.

15. The hydraulic steering arrangement according to claim 1, wherein a steering unit input angle sensor is connected to the controller.

* * * * *